UNITED STATES PATENT OFFICE.

KARL JOSEF BAYER, OF WOBURN, MASSACHUSETTS.

PROCESS OF PRODUCING POTASSIUM CHLORATE.

SPECIFICATION forming part of Letters Patent No. 538,314, dated April 30, 1895.

Application filed September 27, 1894. Serial No. 524,285. (No specimens.)

*To all whom it may concern:*

Be it known that I, KARL JOSEF BAYER, a subject of the Emperor of Austria-Hungary, residing at Woburn, in the county of Middlesex and State of Massachusetts, have invented certain new and useful Improvements in Processes of Producing Potassium Chlorate, of which the following is a specification.

It is well known that in the manufacture of potassium chlorate in the usual manner only about one-fifth of the chlorine gas generated is utilized in the manufacture of potassium chlorate, while about four-fifths of the same is lost as it goes to waste in the form of calcium chloride.

This invention is not so much intended to increase the yield of potassium chlorate, but to utilize in a higher degree the wasted four-fifths of the generated chlorine and regain it in some useful combination. For this purpose, the process of manufacturing potassium chlorate is not carried out with lime as heretofore, but with zinc oxide, which is either obtained from zinc-furnaces, or produced directly by burning metallic zinc, or in any other suitable manner.

In carrying out my improved process, it is advantageous that the zinc oxide, which has to be free of ferric oxide or manganese compounds, be mixed with water, and that the chlorine is conducted in gas-form through said mixture, until the zinc oxide, with the exception of the impurities contained therein, is dissolved. By the action of the chlorine on the zinc oxide, hypochlorite of zinc is first produced besides zinc chloride, the former being split on being subjected to heat in the same manner as hypochlorite of calcium is split, into zinc chlorate and zinc chloride. In case ferric oxide or a large quantity of manganese-compounds is contained in the zinc oxide, it is possible that by the presence of the salts a decomposition of the zinc chlorate under generation of oxygen takes place, which has to be avoided. When the solution of zinc chlorate and zinc chloride of about 20° to 22° Baumé is mixed with the corresponding quantity of potassium chloride (KCl) and subjected to heat, the latter is dissolved, and during the cooling off of the solution, potassium chlorate is crystallized from the same. By again dissolving this potassium chlorate and crystallizing it from the solution, it can be obtained in a perfectly pure state. The decanted liquor contains zinc in the form of zinc chloride. This liquor is concentrated by evaporation to a density of about 30° to 32° Baumé, whereby some of the potassium chlorate in solution is separated by crystallization during the cooling of the liquor, so that the remaining zinc chloride solution contains only traces of potassium chlorate, which do not require further attention. The solution of zinc chloride is next evaporated to a density of 70° Baumé, run into casks and put on the market in this form. The zinc chloride obtained in this manner is sufficiently pure for most applications and equal to zinc chloride obtained by the ordinary processes.

The advantages of my improved process are that by the use of zinc oxide in place of lime besides the potassium chlorate, a marketable zinc chloride is obtained, by which the chlorine which cannot be transformed into potassium chlorate, is utilized advantageously for the market.

Having thus described my invention, I claim as new and desire to secure by Letters Patent—

1. The process herein described of producing potassium chlorate which consists in subjecting zinc oxide in place of lime to the action of chlorine, splitting up the hypochlorite of zinc obtained thereby into zinc chlorate and zinc chloride, and transforming the zinc-salts thus obtained by mixture with potassium chloride into potassium-chlorate and zinc chloride, substantially as set forth.

2. The process herein described of producing potassium chlorate, which consists in subjecting zinc oxide to chlorine gas, transforming the hypochlorite of zinc obtained into zinc chlorate and zinc chloride, mixing the solution with potassium chloride and separating the potassium chlorate by crystallization while the zinc is obtained in the decanted liquor in the form of zinc chloride, substantially as set forth.

In testimony that I claim the foregoing as my invention I have signed my name in presence of two subscribing witnesses.

KARL JOSEF BAYER.

Witnesses:
J. FRIES,
J. B. WALKER.